United States Patent [19]

Bruke

[11] Patent Number: 5,092,453
[45] Date of Patent: Mar. 3, 1992

[54] HELICAL CONVEYOR

[75] Inventor: Richard Bruke, Bunkeflostrand, Sweden

[73] Assignee: Spirac Engineering AB, Malmo, Sweden

[21] Appl. No.: 557,156

[22] Filed: Jul. 13, 1990

[30] Foreign Application Priority Data

Nov. 10, 1988 [SE] Sweden .............................. 8804061-3
Nov. 9, 1989 [SE] Sweden .............PCT/SE89/00639

[51] Int. Cl.⁵ ................................................ B65G 33/26
[52] U.S. Cl. ....................................... 198/673; 198/676
[58] Field of Search ............... 198/657, 658, 659, 672, 198/673, 676

[56] References Cited

U.S. PATENT DOCUMENTS

| | | | |
|---|---|---|---|
| 238,194 | 2/1881 | Winterhalter | 198/658 |
| 311,052 | 1/1885 | Anderson | 198/658 X |
| 1,939,080 | 12/1933 | Pickard | 198/676 X |
| 2,414,536 | 1/1947 | Kirk | 198/676 X |
| 2,443,942 | 6/1948 | Winkler et al. | 198/676 X |
| 2,665,796 | 1/1954 | Anderson | 198/658 |
| 2,981,403 | 4/1961 | Goodrich | 198/676 |
| 3,764,062 | 10/1973 | Brautigam | 198/676 X |
| 3,802,551 | 4/1974 | Somers | 198/659 |
| 3,937,317 | 2/1976 | Fleury, Jr. | 198/676 |
| 4,003,115 | 1/1977 | Fisher | 198/658 X |
| 4,091,693 | 5/1978 | Straub | |
| 4,577,564 | 3/1986 | Tomita et al. | 198/676 X |
| 4,949,836 | 8/1990 | Schostek | 198/676 |

FOREIGN PATENT DOCUMENTS

| | | | |
|---|---|---|---|
| 2115791 | 10/1972 | Fed. Rep. of Germany | 198/676 |
| 3527548 | 3/1987 | Fed. Rep. of Germany | 198/676 |
| 689181 | 9/1930 | France | 198/676 |
| 173704 | 12/1960 | Sweden . | |
| 1214554 | 2/1986 | U.S.S.R. | 198/676 |

Primary Examiner—D. Glenn Dayoan
Attorney, Agent, or Firm—Ladas & Parry

[57] ABSTRACT

An apparatus for displacing material includes a transport thread composed of a central thread spiral and an outer thread. The outer thread spiral is fixed to one of the radially directed defining surfaces of the central thread spiral. The central thread spiral is dimensioned so as, without permanent deformation, to absorb at least the major portion of the mechanical forces occurring in the axial and radial direction of the transport thread. The outer thread spiral has an outer surface which faces away from the geometric centre axis of the transport thread and is of shorter extent in the axial direction of the transport thread and is located more distally from the center axis than the outer surface of the central thread spiral. By regulating the extent in the axial direction of the transport thread of the surface of the outer thread spiral turned to face the substrate, the abutment pressure of the transport thread will be adapted to the substrate in relation to the properties of the material being displaced.

12 Claims, 2 Drawing Sheets

HELICAL CONVEYOR

This is a continuation of copending application international application PCT/SE89/00639 filed on Nov. 9, 1989 and which designated the U.S.

TECHNICAL FIELD

The present invention relates to an apparatus for conveying material and particularly to the construction of a shaftless screw conveyor having an inner or central spiral member to which is fixed on outer spiral member.

BACKGROUND ART

Within the field of material handling, screw conveyors are employed in which is included a spiral thread (screw thread) manufactured of flat rolled steel placed on its edge, i.e. a screw with no mechanical center shaft, in which the screw is disposed in a casing and is rotated about its geometric center axis. In the description that follows, the expression "shaftless screw conveyor", "shaftless thread" and "shaftless screw" will often be employed to designate a screw conveyor with a spiral thread of the above design.

Prior art shaftless screw conveyors enjoy many advantages such as light weight, simple design, low production costs, generally high conveyance capacity, high operational reliability, small risk of damage etc. As a result, there are many incentives to extend the field of application of the shaftless screw conveyor so as to encompass materials which have hitherto not been conveyed or have been conveyed only with difficulty (low capacity, high driving power output, considerable wear) by means of shaftless screw conveyors. Examples of such materials are materials which readily become compacted and, consequently, form a compressed material layer in the conveyor between the screw and its casing. In the following description, the term "dense" materials will be employed for such materials, these consisting of, for instance, earth, compost, fine-grained sand, sludge with a high TS (total solids) content, fly ash, etc.

A shaftless screw conveyor is, in many physical applications journalled only at one end, the drive end, where it is also coupled to a drive unit. As a rule, the drive unit is also employed as a journal for the shaftless screw. Even if the shaftless screw possesses relatively high mechanical strength in its axial direction, it is so elastic in the radial direction that the screw, in an empty screw conveyor, rests against the lower inner surface of the U-shaped passage or casing after only one or a few helical turns. In certain physical applications, such screw conveyors are extremely long, lengths of 30–50 m being not uncommon. The elasticity in the radial direction is utilized to provide the possibility for the screw thread to deflect in the radial direction if pieces of material are jammed between the threads and the wall of the casing. Hereby, the risk will be eliminated that the shaftless screw is damaged by a lengthy deformation in the axial and/or radial direction.

In the design and manufacture of the shaftless screw conveyors, attempts are made to realize a spiral or helical thread which is flexible in the radial direction but is as stable as possible in the axial direction. Attempts are made in this art to achieve this goal by employing more and more robust — and above all — greater dimensions and by using steel materials of as "hard" properties as possible. Prior art common dimensions are 50×20, 60×25 and 80×25 mm. The employment of a "hard" steel is also advantageous from the point of view of resistance to wear. However, a restricting factor is that hard steels are difficult to shape. One skilled in the art will readily perceive that, in the production of a spiral thread from a flat-rolled steel, the hardness and dimensions of the steel and the radii of curvature of the spiral thread (internal and external) together make up the restricting parameters within which designers and manufacturers must adhere, for technical and economical reasons.

A screw thread of the type referred to above suffers from the drawback that, in certain physical applications — and in particular when "dense" or heavy materials are to be conveyed — the screw thread is lifted by the material which is to be displaced, since the rotating thread abuts against the material only by its own weight. In particular in physical applications in which the thread is exposed to large axially directed forces, for example since it is intended to be included in an apparatus with large displacement capacity and/or is adapted for the displacement of heavy materials, it is necessary, in the dimensioning of the screw thread, to impart such great mechanical strength to the thread that the thickness of the thread blade i.e. its extent substantially at right angles to the radial direction of the thread, entails that the abutment surface of the thread against the substrate will be large and, thereby, the abutment pressure of the thread (force per surface unit) against the substrate will be low. This leads in turn to the consequence that screw conveyors which include a shaftless spiral cannot be employed in certain physical applications, since the thread penetrates insufficiently down into the material which is to be displaced. The nature of the material itself influences the tendency for the screw to ride up and in particular when the material is fine-grained and heavy or when it is tacky and tends to adhere to the bottom of the conveyor passage or casing, this tendency to rise and ride up is amplified.

As already mentioned, it is of utmost importance that the spiral thread be designed so as to be configuratively stable in the axial direction. The pitch of the thread affects the axial configurative stability, since, for a shorter pitch the thread is more resiliently yieldable and compressible. In order to obtain an acceptable stability in the axial direction, a rule of thumb applies that the pitch of the thread be selected to be at least equal to the diameter of the thread. In order that transport capacity is not reduced, it is, however, necessary to employ, in inclined installations as short thread pitches as possible. As already stated, reduced pitch entails reduced mechanical configurative stability in the axial direction, i.e. the thread becomes more resiliently yieldable. As a result, in order to maintain configurative stability, the thread is made thicker which, of course, causes the abutment surface against the substrate to increases. As was mentioned above, a large abutment surface is disadvantageous, and is particularly sensitive in an inclined conveyor, since in such a construction, the slope alone entails that the abutment pressure to be reduced, and as a result, the lifting effect of the material on the screw thread is amplified. In addition, for optimum utilization of the transport capacity of the conveyor, a high filling degree is required, which further increases this lifting effect. The mutually conflicting design and construction requirements result in something of a serious dilemma.

In an inclining inclined conveyor there is often an undesirably high filling degree in its lower portion in that, for example, fine-grained material to some extent passes rearwardly over the blades of the spiral thread. Material hereby accumulates in the lower portion of the conveyor, which further intensifies the lifting effect on the screw thread in this lower portion. These difficulties have hitherto been overcome by welding guide vanes within the casing in positions above the spiral thread in order to prevent the thread from being lifted up by the material conveyed. Such guide vanes suffer, however, from the drawback that they increase friction, which leads to increased wear and to the need for greater driving power, which naturally results in increased costs for the plant. Moreover, the guide vanes reduce the possibilities of the thread to "snake" off in the radial direction if pieces of material become jammed between the thread and the wall of the passage or casing. As a result, the thread will be exposed to greater mechanical stresses and the risk of damage to the thread increases. Increasing the mechanical strength of the thread itself is no solution to these problems, since the lifting effect of the material being conveyed is thereby reinforced and the risk for jamming and seizure increases even more. Once again, mutually conflicting design and construction conditions may be identified.

SUMMARY OF THE INVENTION

The present invention provides a method and an apparatus in which the above-outlined drawbacks are obviated. This is achieved by constructing the spiral thread with an inner spiral member of substantial mass to resist deformation and an outer spiral member affixed to the inner spiral member and having an outer edge of lesser axial extent located radially outwards of the inner spiral member, is designed in accordance with that disclosed in the characterizing clause of claim 1.

The present invention realizes the combination of a spiral thread which is rigid in the axial direction, a small abutment surface against the substrate and a relatively small thread pitch in the spiral thread. The previously mentioned thread pitch is achieved with retained or increased thread pitch in the central thread spiral employed according to the present invention, i.e. retained or increased axial mechanical strength thereof as compared with prior art spiral threads, at the same time as the outer thread spiral gives increased blade height, i.e. driving surface for the goods to be conveyed, in the transport thread comprising the two thread spirals. Since the outer thread spiral is determinative of the abutment surface of the transport thread, there will also be achieved, according to the present invention, an expedient dimensioning of the mechanical strength of the central thread spiral and, thereby, mechanical strength of the transport thread. The transport thread, will, thereby, possess a great capacity to absorb axially directed forces during operation, without suffering from permanent deformation. The outer thread spiral reduces the abutment surface against the substrate of the transport thread and is employed in many physical applications to increase the total drive surface (transport surface) which the transport thread faces towards the discharge portion of the apparatus. The above disclosed increase of the pitch of the central thread spiral makes it possible, compared with prior art technology, to increase the axial configurative stability of the entire thread, or reduce the material thickness in the central thread spiral, and thereby the material consumption therefor.

An additional advantage inherent in the present invention is that, in certain embodiments, it is possible, by adapting the orientation of the abutment surface of the outer thread spiral against the substrate, to ensure that the outer thread spiral, and thereby the transport thread, has a tendency to work down into (penetrate down into) the material being conveyed, a property which is of particular value in the case of material possessing powerful lifting properties on the transport thread. By imparting, in certain embodiments, to the defining surface of the outer thread spiral facing away from the center axis an orientation which deviates from the orientation of a casing surface of an imaginary cylinder with a center axis substantially coinciding with that of the transport thread and, in such instance, causing the defining surface to be directed, somewhat outwardly towards the inner defining surface of the casing in a direction towards the discharge end of the transport thread, the capability of penetrating into the material being conveyed will be intensified and, thereby, the transport capacity of the transport thread will be increased.

In certain physical applications, the previously-mentioned obliquely inclined surface comprises but a portion of the defining surface of the outer thread spiral facing away from the center axis, while the remaining portion thereof is disposed substantially parallel in relation to the surrounding casing. This arrangement compensates for the downwardly steering tendency of the abutment forces against the substrate which occurs in conjunction with the surface disposed substantially parallel with the center axis.

The present invention also possesses a considerable advantage from the point of view of manufacture, which leads to improved properties of the transport thread. In order to achieve requisite mechanical strength of the transport thread while maintaining reasonable production costs, the flat-rolled steel is cold formed into the thread spirals of which the transport thread is composed. In this instance, use is made of as hard and durable a steel as possible. The cold forming is particularly difficult in large dimensions of the flat-rolled steel when this is used to produce a thread spiral whose inner diameter is small, and in which the difference between the outer and inner diameters of the thread spiral is large. As a result of the combination proposed according to the present invention of a central thread spiral and an outer thread spiral, the size of the difference between the outer and inner diameters of each respective thread spiral will be reduced. Moreover, the inner diameter of the outer thread spiral is large and, in relation thereto, the diameter differences of the outer thread spiral are small, at the same time as this is produced from a flat rolled steel of smaller dimensions, which makes it possible to use extremely hard steel when necessary in the cold forming of the outer thread spiral. Of course, there will be achieved by such means an extremely good level of endurance of that portion of the transport thread which abuts against the substrate and, as a result, a long service life for the transport thread.

BRIEF DESCRIPTION OF THE FIGURES OF THE DRAWING

FIG. 1a is a cross section taken along the line 1a—1a in FIG. 1; and

DETAILED DESCRIPTION OF PREFERRED EMBODIMENTS

Figure 1:
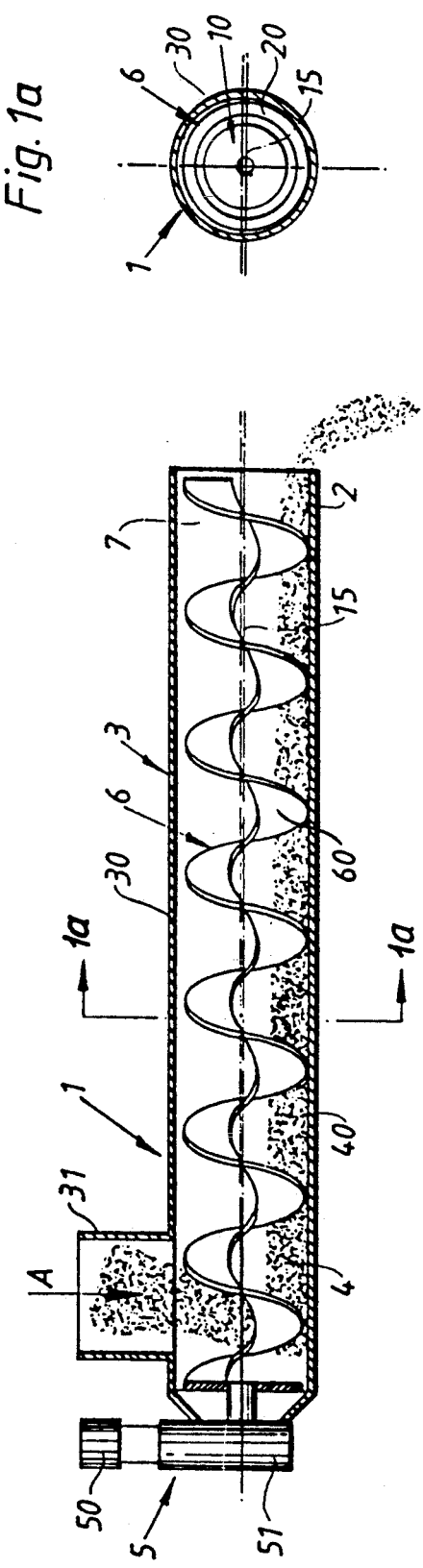
FIG. 1 is a cross section through a conveyor according to the invention.
Figure 2:
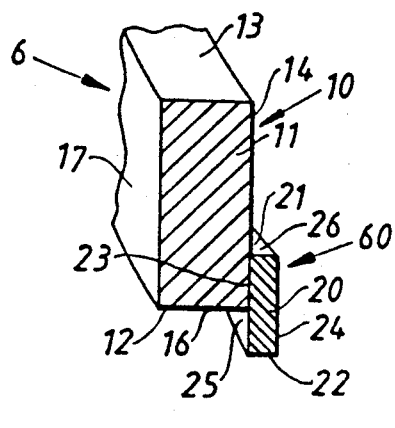
FIGS. 2-5 are partial sections through alternative embodiments of transport threads according to the present invention.

Referring to the drawings, FIGS. 1 and 1a show an embodiment of material transport apparatus 1 including a conveyor 3 including a transport spiral 6 which is formed as a thread blade 60 lacking any mechanical center shaft. As a consequence the thread 6 has a central opening and can be seen as a shaftless spiral. The transport thread is disposed in a passage 30, which can be for example, a U-shaped passage or a cylindrical casing. In physical applications in which the path forms passage is formed by a casing, this at least partially surrounds the transport thread in its circumferential direction. At the right end of the conveyor there is disposed a discharge opening 2, and at its left end an infeed station 4 opening for supplying (arrow A) material (transport goods) 40 to the conveyor through the intermediary of an infeed device 31, for example a funnel. In proximity to the infeed station, the transport thread is connected to a drive means 5 comprising a motor 50 and a journal and gear unit 51. The transport thread 6 is journalled in the gear unit and drive means in order to be rotated about its geometric longitudinal axis 15.

The transport thread 6 includes an inner central thread spiral 10 (cf also FIGS. 2-5) formed from a helical flat-rolled steel member 11 placed on its edge, and an outer thread spiral 20 which is disposed in conjunction with the defining edge 12 of the central thread spiral facing away from the geometric center axis 15 of the transport thread 6. Edge 12 has a defining surface 16 facing towards the casing 30 and extending along substantially the entire length of the central thread spiral. In the continued description, use will be made of the designation center axis 15 when the geometric center axis 15 of the transport thread is intended. The outer thread spiral has a defining surface 22, 22a, 22b facing away from the center axis 15 and being, in the axial direction of the transport thread, of shorter extent than the defining surface 16 of the central thread spiral facing away from the center axis 15, in addition to which the defining surface of the outer thread spiral is located further away from the center axis 15 than the defining surface 16 of the central thread spiral.

In the drawings, the defining surface of the central thread spiral facing towards the center axis 15 is designated 13, the defining surface facing towards the infeed station 4 is designated 17 and the defining surface facing towards the discharge portion 2 (the drive surface) has reference numeral 14. For corresponding defining surfaces of the outer thread spiral, use is made of the reference numerals 21, 21a; 25 and 24, respectively. In the embodiments according to FIGS. 2-5, the defining surfaces 21, 21a, respectively, of the outer thread spiral 20 facing towards the center axis 15 define a shoulder 26, 26a which is formed between the drive surface 24 of the outer thread spiral and the drive surface 14 of the central thread spiral. In certain embodiments, the defining surface 21 of the shoulder is oriented substantially at right angles to the drive surface 14 of the central thread spiral (cf. FIGS. 2, 3 and 5), while in other embodiments (cf. FIG. 4) the defining surface 21a is directed such that an obtuse angle is formed between the defining surface and the drive surface 14 of the central thread spiral. The inner diameter of the outer thread spiral 20 is less than the outer diameter of the central thread spiral 10, in addition to which the outer thread spiral abuts, with a portion of its substantially radially directed defining surfaces, against one of the substantially radially directed surfaces of the central thread spirals. In one preferred embodiment, the outer thread spiral abuts with its defining surface 25 facing towards the infeed station 4 against that defining surface 14 of the central thread spiral which faces the discharge portion 2. The outer diameter of the outer thread spiral 20 is larger than the outer diameter of the central thread spiral 10, which implies that, in a helical band region defined by the defining surface 25 of the outer thread spiral facing towards the center axis 15, the outer thread spiral overlaps the central thread spiral. By such means, any possible problems which the diameter discrepancy of the outer thread spiral and of the central thread spiral, respectively, would have occasioned on joining together of the spirals (for example by welding) will be eliminated.

Figure 4:
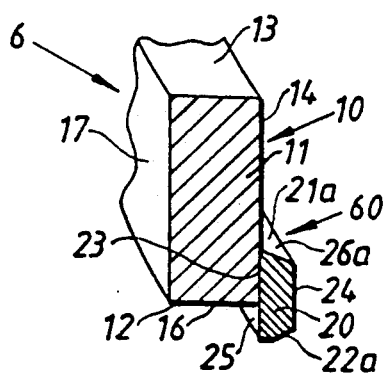

Concerning the defining surface 22, 22a, 22b of the outer thread spiral which faces away from the center axis 15, this surface has, in certain embodiments, an orientation which is substantially parallel to a cylindrical casing or envelope surface with a center axis common to the center axis 15 of the transport thread, while in other embodiments the defining surface 22a, 22b makes an angle with the casing surface In certain embodiments, the defining surface 22b is directed outwardly towards the inner defining surface of the casing in a direction towards the discharge end 7 of the transport thread (FIG. 5), and in other embodiments, at least a portion of the defining surface 22a is directed inwardly from the inner defining surface of the casing in a direction towards the discharge end of the transport thread (FIG. 4).

In certain physical applications, the drive surfaces 24 and 14 of the outer thread spiral and the central thread spiral, respectively, are disposed such that they substantially continually merge with one another.

In applications in which demands are placed on a particularly small abutment surface of the transport thread against the substrate, the outer thread spiral, at least in a region 27 most proximal the defining surface 22, 22a, 22b of the outer thread spiral facing away from the center axis 15, is provided with a cross section which reduces with increasing distance from the center axis 15. In one preferred embodiment, the reducing cross section is achieved in that the surface 25 of the outer thread spiral facing towards the infeed station in the region 27 is provided with a bevel 28 or corresponding tapered configuration, for example a cross section corresponding to the cross section of a truncated cone.

In yet a further embodiment of the present invention, the outer thread spiral 20 comprises, at least in the region defined by the surface 22, 22a, 22b facing away from the center axis 15, with a wear-resistant material.

Material 40 which is fed into the apparatus 1 in the direction of the arrow A via the infeed device 31, falls down towards the bottom region of the conveyor 3 and is displaced on rotation of the transport thread 6 from the infeed station 4 of the apparatus and towards its discharge portion 7 in order there to depart from the conveyor path. The central thread spiral 10 is of a dimension and pitch which are adapted to meet the mechanical stresses which the transport thread will be exposed to in the relevant field of application. Even for a large pitch of the central thread spiral, a high transport throughput capacity of the apparatus will be maintained, in that the outer thread spiral increases the size of the drive surface of the transport thread, i.e. the extent of the transport thread in the radial direction and also the relationship between the outer diameter and pitch of the screw thread. In mechanical stresses acting on the outer thread spiral, these are transmitted for the greater part to the central thread spiral and are absorbed thereby.

Consequently, there is considerable freedom of choice as regards thickness of the outer thread spiral, i.e. its extent in the axial direction of the transport thread 6. Moreover, there is considerable freedom of choice in respect of the shape of the cross section of the outer thread spiral and the direction of the defining surface 22, 22a, 22b which the outer thread spiral. Hereby, it will generally always be possible to adapt the abutment surface 22, 22a, 22b of the transport thread 6 to the weight of the transport thread and the properties of the material which is to be displaced in the conveyor apparatus. The increase of the diameter of the transport thread which is achieved by means of the outer thread spiral also facilitates optimization of the relationship between the diameter of the transport thread and the pitch of the transport thread. This is of particular value in inclined conveyors for which the transport throughput capacity of the lower region is wholly determinative of the total capacity of the conveyor. Furthermore, the outer thread spiral has, as a rule, a total mass which is considerably less than the mass of the central thread spiral even in physical applications in which both of the thread spirals have a substantially corresponding radial blade height. As a result, the total weight of the transport thread is reduced in relation to prior art technology in which the transport thread is not divided into two separate thread spirals designed and dimensioned for solving two substantially separate sub-problems in a common task for the transport thread.

Figure 3:
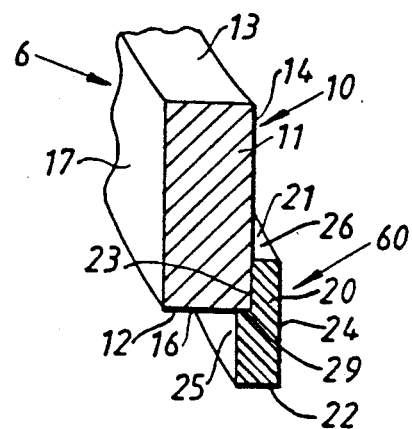

In the embodiments according to FIGS. 2-5, in which the shoulder 26, 26a is formed in the transition between the drive surfaces 14 and 24, respectively of the two thread spirals, the effect will also be achieved that, on rotation of the transport thread, material is accumulated against the defining surface 21, 21a of the shoulder, and, thereby is instrumental in increasing the abutment pressure of the transport thread against the substrate, i.e. the material which the transport thread is displacing. In the embodiment illustrated in FIG. 4, there occurs, between the oblique defining surface 21a of the shoulder 26a and that material 40 which is forced, by the transport thread 6 on its rotation, towards the discharge portion 2 of the conveyor, an interplay of forces which entails that a radial component of forces is created in the defining surface 21a which is directed away from the center axis 15. This component thus contributes to increasing the abutment pressure of the transport thread against the substrate. FIG. 3 illustrates an embodiment of the present invention in which the outer thread spiral 20 is provided with a recess 29 in surface 25 with in the outer thread spiral abuts against the central thread spiral. There will hereby be achieved a supporting function of the outer thread spiral when this is — for example on — material accumulation — exposed to radially directed forces. This embodiment also makes it possible, on spot welding of the outer thread spiral to the central thread spiral, to place the welding points in greater spaced-apart relationship from one another.

Figure 5:
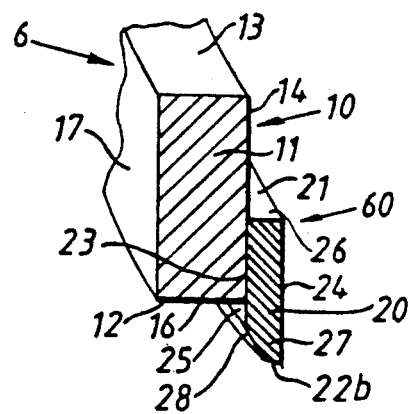

FIGS. 4 and 5 illustrate how the defining surface 22a, 22b, respectively, of the outer thread spiral facing away from the center axis 15 has an "oblique" orientation. In the embodiment illustrated in FIG. 4, the defining surface is of an orientation which entails that, in a direction towards the discharge portion 2 of the conveyor path, it is also directed towards the center axis 15, while, in the embodiment according to FIG. 5, it is directed away from the center axis 15 in a direction towards the discharge portion 2. The first of these embodiments is selected, for instance, when — for weight reasons — the dimensions of the transport thread 6, and thereby also of the outer thread spiral 20, are to be minimized, and this minimization entails that the extent of the outer thread spiral in the axial direction of the transport thread will be so slight that the defining surface 22a which faces the substrate will far too easily penetrate through the material which is being displaced. On rotation of the spiral, such a penetration would entail that the abutment surface of the transport thread would substantially come into abutment against the inner surface of the conveyor easing, whereby there would occur an unacceptably rapid wearing of the transport thread and/or the transport casing. As a result of the above mentioned orientation and/or design of the defining surface, the spiral is guided to some degree up from the substrate and compensates for the failure of the material being conveyed to "carry" the transport thread. The material being conveyed thereby forms an abrasion-reducing layer between the thread spiral and the substrate. It will be obvious to one skilled in the art that the magnitude of the lifting effect which the oblique orientation of the defining surface produces is regulated by means of the orientation of the defining surface and/or its extent in the axial direction of the transport thread. It will be obvious that, in certain physical applications, only a portion of the defining surface 22a of the outer thread spiral 20 facing away from the center axis 15 can be disposed obliquely in relation to the axial direction of the transport thread.

FIG. 5 shows an embodiment of the present invention in which the capability of the transport thread to penetrate into the material has been increased. This is achieved as a result of the above angular orientation of the defining surface 22b, in the direction towards the discharge portion 2 away from the center axis 15. As a result of the reduction of the extent of the thread spiral 20 in the axial direction of the transport thread in the region 27 most proximal the defining surface of the outer thread spiral facing away from the center axis, the abutment pressure and, thereby, the capacity of the transport thread to penetrate into subjacent material is, in certain embodiments, also increased.

It will be apparent from the above description that the present invention affords an extremely high freedom of choice in dimensioning of the transport thread. Contemplated mechanical stability, in particular in the axial direction of the transport thread, and optimation of the relationship between the pitch and the diameter of the transport thread will be achieved, together with the intended regulation of the penetration of the transport thread into the material being conveyed, in dependence upon the nature of the material. All of this results in an improved transport throughput capacity and an extension of the field of application for screw conveyors with shaftless screws.

The above detailed description has referred to but a limited number of embodiments of the present invention, but one skilled in the art will readily perceive that the present invention encompasses a large number of embodiments without departing from the spirit and scope of the appended claims.

What is claimed is:

1. Conveyor apparatus for material transport comprising a casing having an inlet end and a discharge end, a shaftless helical conveyor in said casing, said shaftless helical conveyor being rotatable around an axis of rotation, said shaftless helical conveyor including a central spiral member and and outer spiral member to said central spiral member, each of said central and outer spiral members respectively comprising a flat spiral blade having flat opposite side surfaces and inner and outer end surfaces, one of said flat side surfaces of said central spiral member being in face to face secured contact with one of said flat side surfaces of said outer spiral member in an arrangement in which the flat contacting side surfaces of the central and outer spiral members overlap and said outer spiral member extends radially outwardly of said central spiral member, said central spiral member having greater mass than said outer spiral member to resist, without residual deformation, mechanical forces applied to the conveyor, said outer end surface of said outer spiral member having an extent in the axial direction which is less than the axial extent of the central spiral member.

2. Conveyor apparatus as claimed in claim 1 wherein said central spiral member has a substantially rectangular cross-section.

3. Conveyor apparatus as claimed in claim 2 wherein said inner end surface of said outer spiral member forms a shoulder with the central spiral member.

4. Conveyor apparatus as claimed in claim 3 wherein said shoulder is inclined relative to said one surface of the central spiral member which is overlapped by the outer spiral member.

5. Conveyor apparatus as claimed in claim 4 wherein said shoulder extends at an obtuse angle relative to said one surface of the central spiral member.

6. Conveyor apparatus as claimed in claim 1 wherein said outer spiral member includes an outer edge portion disposed radially outwards of said central spiral member which tapers in narrowing fashion radially outward to said outer end of the outer spiral member.

7. Conveyor apparatus as claimed in claim 6 wherein said outer end surface of said outer spiral member extends parallel to a cylindrical surface of said casing and has a center coincident with the axis of rotation of the helical conveyor.

8. Conveyor apparatus as claimed in claim 1 wherein at least said outer end surface of said outer spiral member is made of abrasion resistant material.

9. Conveyor apparatus as claimed in claim 1 wherein said outer spiral member is made of steel which is harder than steel of said central spiral member.

10. Conveyor apparatus as claimed in claim 1 wherein said outer spiral member has a recess in which said central spiral member is seated.

11. Conveyor apparatus as claimed in claim 1 wherein said side surface of the central spiral member which overlaps the side surface of the outer spiral member faces in the direction of said discharge end of the casing whereas the later said side surface of the outer spiral member faces in the direction of said inlet end of the casing.

12. Conveyor apparatus as claimed in claim 1 wherein the inner end surfaces of said central and outer spiral members are both open to and face a central open passage in sad conveyor.

* * * * *